United States Patent [19]

Brassell

[11] Patent Number: 4,957,522
[45] Date of Patent: Sep. 18, 1990

[54] COMBINATION OF A FILTER AND A MATERIAL PERMEABLE TO GASES BUT IMPERMEABLE TO LIQUIDS

[76] Inventor: Gilbert W. Brassell, 13237 W. Eighth Ave., Golden, Colo. 80401

[21] Appl. No.: 362,151

[22] Filed: Jun. 6, 1989

[51] Int. Cl.$^5$ ............................................. B01D 53/04
[52] U.S. Cl. .................................... 55/316; 55/385.4; 604/333
[58] Field of Search .................. 55/385.4, 502, 503, 55/510, 511, 517, 518, DIG. 2, 159, 316; 604/333

[56] References Cited

U.S. PATENT DOCUMENTS

| | | | |
|---|---|---|---|
| 4,457,758 | 7/1984 | Norton | 55/385.4 X |
| 4,479,818 | 10/1984 | Briggs et al. | 55/385.4 X |
| 4,482,606 | 12/1984 | Leviton et al. | 55/385.4 X |
| 4,668,258 | 5/1987 | Steer | 55/385.4 X |

*Primary Examiner*—Charles Hart
*Attorney, Agent, or Firm*—Millen, White & Zelano

[57] ABSTRACT

Performance of filters is improved by covering a surface thereof with a material which is permeable to gas but impermeable to liquids, e.g., Gortex ®.

4 Claims, 1 Drawing Sheet

COMBINATION OF A FILTER AND A MATERIAL PERMEABLE TO GASES BUT IMPERMEABLE TO LIQUIDS

BACKGROUND OF THE INVENTION

This invention relates to improved filters and applications therefor.

In many uses of filters, it is important and often imperative that the filter be kept free from liquids, typically water. In addition to having potential adverse impact on the properties of the filter, the penetration of the liquid through a vent filter into the interior space being filtered can have serious adverse impact on the contents of that interior space. For example, nuclear waste containers are often vented by high efficiency particular air (HEPA) filters which vent hydrogen gas, inter alia. Especially useful for such applications are carbon-carbon composite filters, e.g., as described in U.S. Pats. Nos. 4,500,328, 4,772,508, 4,391,873 and 4,152,482 and U.S. Pat. Ser. No. 013,501, filed on Feb. 11, 1987, now allowed. It has recently been observed that when such containers (e.g., drums or plastic bags) are stored unprotected from the weather, water can enter into the interior of the drum or bag through the filter. It appears that when rain accumulates on the top of a container such as a drum, it is sucked into the inside of the drum when the interior temperature goes from relatively hot to relatively cold, thereby creating a slight vacuum. Similar phenomena occur in many other filtering applications. Similarly, there are many applications where a wide variety of filters is inapplicable because of a necessary exposure to water or other liquids. Thus, it is desired to keep liquids away from filter element material, e.g., so that liquid cannot penetrate into interior spaces being filtered and/or out of such interior spaces containing liquids.

SUMMARY OF THE INVENTION

This invention relates to a combination of a filter with a material which is substantially pervious to gas and substantially impervious to liquids, e.g., typically permeable to water vapor but impermeable to liquid water.

Thus, this invention relates to a combination of a filter element having at least one surface, and covering at least one surface of said filter element, a material which is permeable to gas and substantially impermeable to liquids.

In preferred aspects, the material is in sheet form and is the commercially available Gortex ® or an equivalent material, the filter is activated carbon or carbon-carbon composite (optionally activated) and the container is made of metal or plastic.

This invention also relates to corresponding containers having in at least one wall thereof a filter combination as described above. Such containers are of the widest variety and include, for example, nuclear waste containers, colostomy bags, etc.

In a basic aspect of this invention, the combination comprises a conventional filter element having on one or all of its surfaces a covering of a material which is substantially pervious to gases and substantially impervious to liquids, such as Gortex ®-like materials mentioned above. The number of surfaces covered by the material will be routinely selectable in accordance with the particular application of the filter which is involved. Thus, in a typical disk-shaped filter, normally only one of the circular surfaces need be covered with the Gortex ®-like material, i.e., either the outside (e.g., when it is desired to protect interior space from liquid penetration through a filter) or inside (e.g., when it is desired to protect against leakage of liquid out of an interior space through a filter) of the filter; of course, it is also possible for both sides to be covered with the material. Correspondingly, in one embodiment of the invention, a packet can be formed of Gortex ®-like material and the packet filled with a conventional filtering substance to form a combination of this invention.

The sizes and shapes of the filter and covering material are not critical. Normally, the dimensions and other properties of the filter will be in accordance with conventional considerations for a given application. Similarly, the shape and dimensions of the covering water-impermeable but gas-permeable material will correspond substantially to that of the filter's surface which is covered thereby. Thicknesses and other properties (e.g., hydrostatic pressure tolerable without water penetration) of these covering materials will be routinely selected and will typically be of the commercially available varieties, e.g., about 0.005–0.020 inches thick, depending on the end-use properties desired.

The covering materials can be combined with filter surfaces to protect the latter from adverse influences of liquids using any compatible attachment means. For example, the covering material will typically be in contact with the surface and will be held in place using materials and methods which in the final arrangement of the combination prevent contact of the filter surface by a liquid. The covering materials can thus be glued at the edges to the surface (e.g., using any conventional adhesive such as RTV silicone) or held in place by pressure, e.g., conventional clamping means.

Suitable covering materials will be any which are permeable to the gases of interest and impermeable, under the conditions of interest, to the liquids of interest. Typically, the gas is water vapor (but not limited thereto) and the liquid is water (but not limited thereto). A preferred such material is the commercially available Gortex ®, commonly used in many applications such as sportswear. See, e.g., U.S. Pat. No. 3,953,566. Any other similar or equivalent material is employable for this invention.

In one preferred embodiment, the filter and covering material combination is assembled in accordance with the details of U.S. Pat. application Ser. No. 362,152 filed on Jun. 16, 1989, , whose contents are entirely incorporated by reference herein.

By the terms "substantially permeable (or pervious)" and "substantially impermeable (or impervious)" herein is meant sufficient permeability to gases to satisfy the requirements of a given end use of a given filter and sufficiently impermeable to liquids such as water to satisfy the requirements of a given end use of a given filter, respectively. Thus, it is known that various covering materials useful for this invention have maximum pressure heads under which they are capable of preventing passage of liquids. Selection of a given material for a given application can be made routinely in conjunction with known properties of the materials and requirements of the application. For example, Gortex ® can pass 0.5–3 liters/min. of water vapor at 1 psi with no liquid water intrusion after exposure of 24 hours at a vacuum of 23 in. of $H_2O$.

The filter or filter element employable for this invention can be any conventional such filter or element. In this sense, the term "filter" or "filter element" has the most generic definition and typically includes materials which absorb, or adsorb, or merely retain on their surfaces, particles, gases, fluids, or liquids whose passage is desired to be prevented. In a preferred embodiment, the filter element is made of a carbon-carbon composite, such as described in the U.S. Patents mentioned above. These are especially applicable to venting of nuclear waste containers since they permit passage of gases while filtering out particulates with an efficiency of 99.97%. Such vent filters having a thin film of Gortex ®, e.g., having a thickness of 0.005-0.020 inches, typically about 0.010 inches, on the outer surface thereof prevent penetration of water through the vent into the interior of a nuclear waste container. Such a filter combination prevents passage of water even when subjected to a negative pressure such as might be caused by a temperature decrease in situ, e.g., vacuum pressures on the order of 24 inches of water which can commonly occur.

In view of the improvement provided by this invention, these carbon-carbon nuclear material filters can be employed on containers such as drums or plastic bags which are stored outdoors with little concern about penetration of water. Similarly, the same combination of covering material and filter can be employed in conjunction with the recently developed venting of plastic bags containing nuclear waste. Prevention of water entry eliminates the prior concern of containment loss due to the adverse effects of water. Similarly, this invention now provides the capability for venting gases from radioactive material (nuclear waste) containers which must be stored under water in view of the high level of radioactivity involved. This improvement, thus, represents a major advancement in the field of nuclear waste containment.

Similar advantages can be derived for any other filter material employed in conjunction with the covering material per this invention. For example, the combination can be employed in conjunction with other common waste-containing containers such as bags, e.g., colostomy bags, plastic garbage bags, bags used for collection of body waste products by astronauts, and generally any sort of container, typically made of metal or plastic but also of any other material, of any imaginable shape, e.g., rectangular, tubular, jars, etc.

Similarly, the contents of such containers can now have the widest variety of characteristics. Not only is this invention applicable to solid and gaseous contents, but also to liquids, slurries, fluids, solutions, etc.

The location of the filter-covering material combination of this invention will not be critical. It will typically be in a wall of a container, wherein the term "wall" is taken to include not only side walls, but also top and bottom surfaces, caps, lids, etc.

This invention is also widely applicable to any kind of filtering material or related material including, not only the preferred carbon-carbon composite material (optionally activated) mentioned above, but also generically to any sort of filtering materials such as activated carbon in general, activated carbon-carbon composite, ceramic materials, including carbon-ceramic composite materials and ceramic-ceramic composite materials, sintered metal materials, natural materials such as clays, talc, sand, etc., and generically any surface which provides an adsorbent or absorbent function and/or a function preventing passage of a desired material.

Contents of filtered containers of this invention include waste material in general, including the mentioned radioactive or nuclear waste material, human or mammalian waste, garbage, industrial waste, chemicals, etc. The invention is also applicable to the vented storage of essentially any material, including food, clothing, supplies, etc. The invention is also applicable to conventional filter elements for various electronic equipment or for use in devices such as air cleaners, air purifiers, air filters, etc.

BRIEF DESCRIPTION OF THE DRAWINGS

Various other objects, features and attendant advantages of the present invention will be more fully appreciated as the same becomes better understood when considered in conjunction with the accompanying drawing wherein.

DETAILED DESCRIPTION

Figure 1:
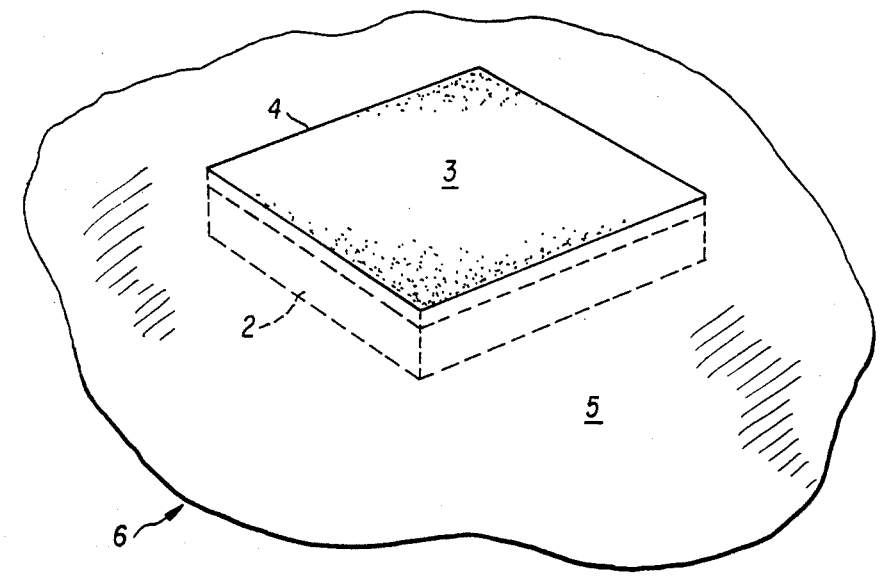
FIG. 1 is a perspective view of a first embodiment of this invention showing a filter element disposed adjacent an opening in a container with a gas-permeable, liquid-impermeable material disposed on the exterior surface of the filter element.

Referring now to FIG. 1, FIG. 1 illustrates a first embodiment of the invention in which a filter element 2 is covered with a gas-permeable, liquid-impermeable material 3 to filter an opening 4 in a wall 5 of a container 6. In the illustrated embodiment, a container 6 is shown, however, it should be kept in mind the filter assembly could be placed in any barrier wall where it is desirable to vent gases while prohibiting the entrance of liquids. In accordance with one embodiment of the invention, the container 6 is a plastic bag or drum containing nuclear waste material which is to be vented to the atmosphere. In such an embodiment, the filter element is preferably comprised of an active carbon or carbon-carbon composite and the material 3 is fabric such as Gortex ® fabric or the like, which is gas-permeable but liquid-impermeable and is disposed at the interface with the atmosphere.

Figure 2:
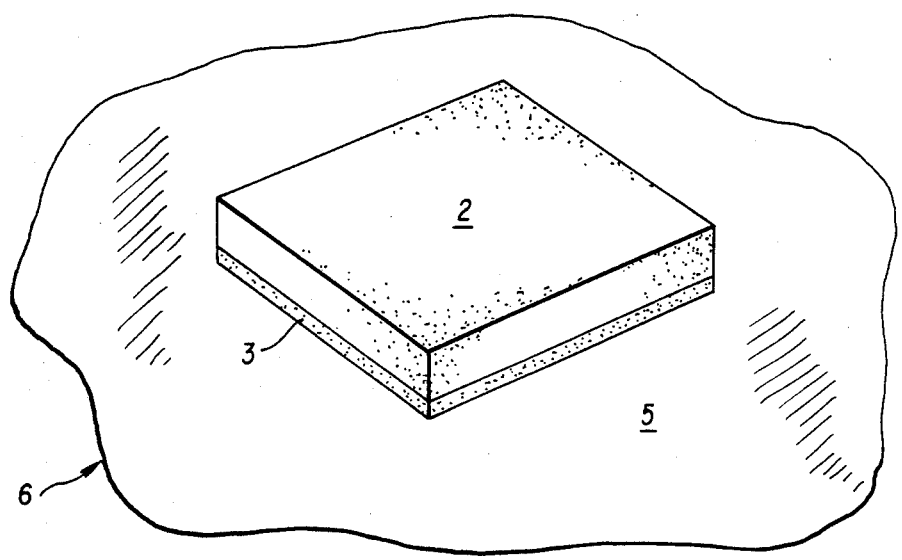
FIG. 2 is a perspective view showing a container with a filter element disposed to filter an opening in the container with a gas-permeable, liquid-impermeable material disposed on the interior surface of the filter element; and, FIG. 3 is a perspective view of a filter element, partially in section showing a carbon-carbon unitary mass of filter material covered by a layer completely covered by a gas-permeable, liquid-impermeable material.

Referring now to FIG. 2, the arrangement is essentially the same, however, the layer of fabric 3 faces the inside of container 6 and is useful in preventing liquid from passing through the filter element while allowing vapor to pass. Such an arrangement is of particular interest in devices such as colostomy bags wherein it is desirable to retain liquid in the bags to vent gas and vapor from the bags through an odor absorbing filter. Again, preferably the filter element in this case is a carbon-carbon filter such as one of the solid mass carbon-carbon composite filters disclosed in the patents cited in the background of the invention.

Figure 3:
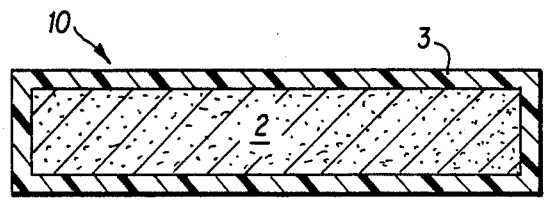

Referring now to FIG. 3, there is shown a filter assembly 10 configured in accordance with the principles of the instant invention wherein the filter element 2 is comprised of a carbon-carbon composite mass (as opposed to a powder or granular structure) which is completely surrounded by a liquid-impermeable, gas-permeable fabric 3 to form the complete assembly which may be retained as a vent or other filtering element for various applications.

It is emphasized that the preferred configuration for filter element 2 throughout this discussion is that of a carbon-carbon composite as is disclosed in the patents enumerated in the background of the invention.

From the foregoing description, one skilled in the art can easily ascertain the essential characteristics of this invention, and without departing from the spirit and scope thereof, can make various changes and modifications of the invention to adapt it to various usages and conditions.

All patents, applications and publications mentioned herein are entirely incorporated by reference herein.

What is claimed is:

1. In combination with a container for containing radioactive material, wherein the container vents gases to the atmosphere through an opening in the wall of the container, a filter element comprised of an activated carbon or carbon-carbon composite disposed in the opening of the container with a first surface facing into the container and a second surface interfacing the atmosphere to which the container vents for filtering out radioactive material from vent gases passing from the container, through the filter element and to the atmosphere; a layer of material completely covering the second surface of the filter element, the material being impermeable to liquid and permeable to vapor thereby allowing filtered vapor to vent from the container while preventing liquid water from entering the container through the filter element.

2. A combination of claim 1, wherein said material is in sheet form.

3. A combination of claim 1, wherein said material is Gortex ® or an equivalent material.

4. A combination of claim 1, wherein said container is a drum or a plastic bag.

* * * * *